US008942597B2

(12) United States Patent
Bell

(10) Patent No.: US 8,942,597 B2
(45) Date of Patent: Jan. 27, 2015

(54) PRINTING SYSTEM

(71) Applicant: Hewlett-Packard Development Company, L.P., Houston, TX (US)

(72) Inventor: Jeffrey F. Bell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 13/906,429

(22) Filed: May 31, 2013

(65) Prior Publication Data

US 2014/0356026 A1 Dec. 4, 2014

(51) Int. Cl.
*G03B 15/08* (2006.01)
*G03G 15/14* (2006.01)

(52) U.S. Cl.
CPC .................................... *G03G 15/14* (2013.01)
USPC ........................................................ 399/121

(58) Field of Classification Search
USPC ........................................ 399/107, 117, 121
See application file for complete search history.

(56) References Cited

U.S. PATENT DOCUMENTS

| | | | | |
|---|---|---|---|---|
| 4,458,254 | A * | 7/1984 | Gerber | 346/134 |
| 4,492,158 | A | 1/1985 | Clark | |
| 4,911,069 | A | 3/1990 | Hayama | |
| 5,132,737 | A * | 7/1992 | Takeda et al. | 399/303 |
| 5,555,802 | A | 9/1996 | Ohinata | |
| 5,669,298 | A | 9/1997 | Negishi | |
| 5,943,954 | A | 8/1999 | Otomo | |
| 6,038,968 | A | 3/2000 | Hara | |
| 6,213,014 | B1 | 4/2001 | Motoe | |

* cited by examiner

*Primary Examiner* — Rodney Fuller

(74) *Attorney, Agent, or Firm* — Hewlett-Packard Patent Department; Adam Franks

(57) ABSTRACT

According to one example there is provided a printing system comprising print engine for printing on a substrate in a print zone, and a drum positioned in proximity to a print zone. The drum supported by a plurality of support rollers in contact with an inner surface of the drum.

12 Claims, 4 Drawing Sheets

PRINTING SYSTEM

BACKGROUND

Some printing systems, such as some industrial digital printing systems, include printing drums which are used during printing operations.

During some printing operations a printing drum may become heated, and as the temperature of the printing drum increases it may be subject to thermal expansion.

BRIEF DESCRIPTION

Examples, or embodiments of the invention will now be described, by way of non-limiting example only, with reference to the accompanying drawings, in which.

DETAILED DESCRIPTION

Due to the precision at which digital printing systems are capable of making printed marks on substrates, any thermally-related expansion or contraction of a printing drum may adversely impact print quality.

Typically, printing drums used in digital printing systems are axially supported. For example, a printing drum may comprise a hollow, or substantially hollow, drum that is connected to a central axle about which the printing drum rotates. The connection between the printing drum surface and the axle may be made in different manners, for example using lateral flanges, spokes radiating from the axle, etc. Typically the drum axle, spokes, and surface are made out of a suitable metal, such as steel or aluminum, or a suitable composite material.

During operation of a printing system the printing drum may become heated above ambient temperature. For example, where the printing system is an inkjet based printing system one or multiple drying modules may be situated around the periphery of the printing drum in order to dry or cure (either completely or partially) printing fluid deposited on a substrate positioned on the printing drum. In another example, a printing drum may become heated above ambient temperature if it is used to receive a substrate that has already been printed on one side and which has been heated as previously mentioned for curing or drying purposes.

Heating of the printing drum surface may lead to the support mechanism between the drum and drum axle to become heated, for example by thermal conduction.

Accordingly, as different parts of the printing drum are heated above ambient temperature thermal expansion may cause the physical size or dimensions of the printing drum to change. Consequently, print quality issues may arise as the printing drum changes in size. For example, in many digital printing systems printing fluid drops may be deposited with an accuracy of between about 10 to 50 microns. Thus, even small changes in the printing drum size can impact the accuracy at which printing fluid drops are deposited on a substrate, and this can result in substandard prints being produced.

These problems are exasperated in printing systems having relatively large printing drums due to the distance between the drum axle and the print engine used to print on a substrate on the printing drum. For example, some printing systems may use printing drums over 1 meter in length, and over 1 meter in diameter.

Figure 1:
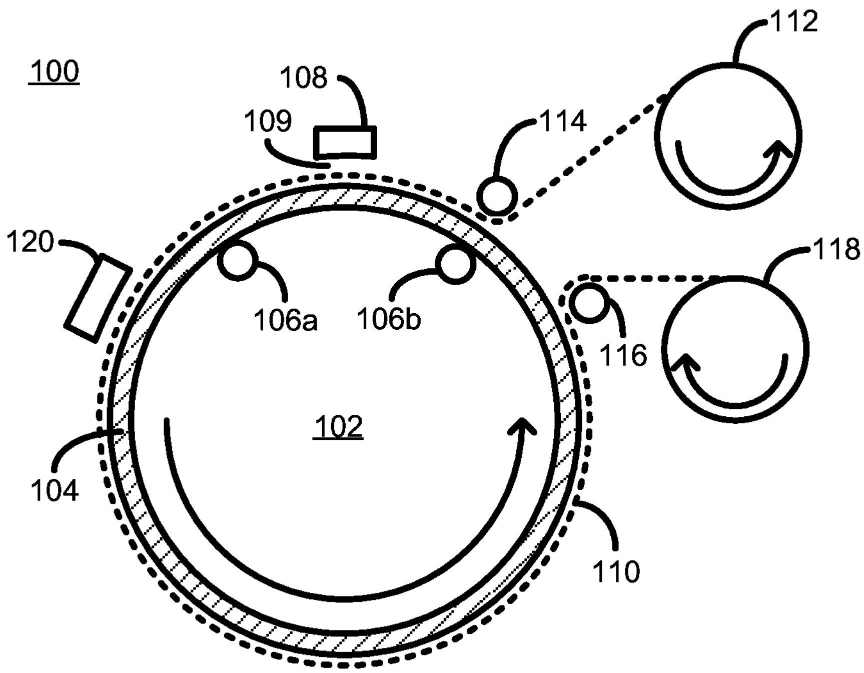
FIG. 1 shows a cross-section view of a simplified printing system according to one example.
Figure 2:
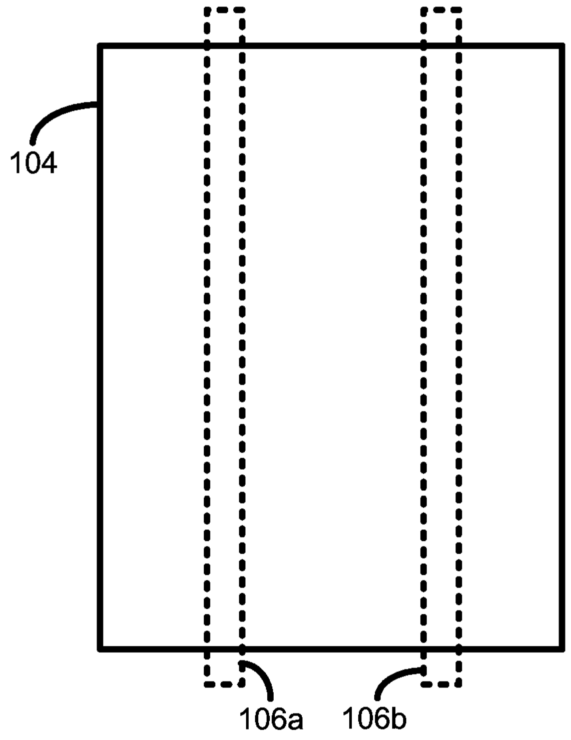
FIG. 2 shows a corresponding plan view of the printing drum shown in FIG. 1 according to one example.

Referring now to FIG. 1 there is shown a simplified cross-section view of a printing system 100 that has a printing drum 102 according to one example. FIG. 2 shows a corresponding plan view of the printing drum 102 in which, for clarity, some elements of the printing system 100 are not shown.

The printing drum 102 is a hollow, or substantially hollow, drum that has a cylindrical drum skin 104. The thickness of the drum skin 104 may vary depending on the type of material or materials used in its construction, but may in some examples vary between 0.5 cm and 3 cm.

The printing drum 102 is supported internally, on an inner surface of the drum, by support rollers 106. In the example shown there are two support rollers **106*a* and 106*b***, although in other examples a greater number of support rollers may be provided.

In one example the support rollers 106 are not driven, with the printing drum 102 being driven indirectly by substrate 110 being wound onto a powered winder 118.

In another example, however, at least one of the support rollers 106 is a drive roller that is powered by a motor, either directly or indirectly, to impart rotary motion to the printing drum 102. When powered, the printing drum 102 rotates about an axis central to the printing drum, even though no central axle is provided.

In one example, the internal surface of the drum skin 104 is smooth and the surface of each of the support rollers 106 is smooth. The support rollers may be covered with a resilient covering, such as rubber, to ensure traction with the internal drum skin 104.

In another example, the internal surface of the drum skin 104 has lateral grooves, in which engage toothed support rollers 106.

Figure 6:
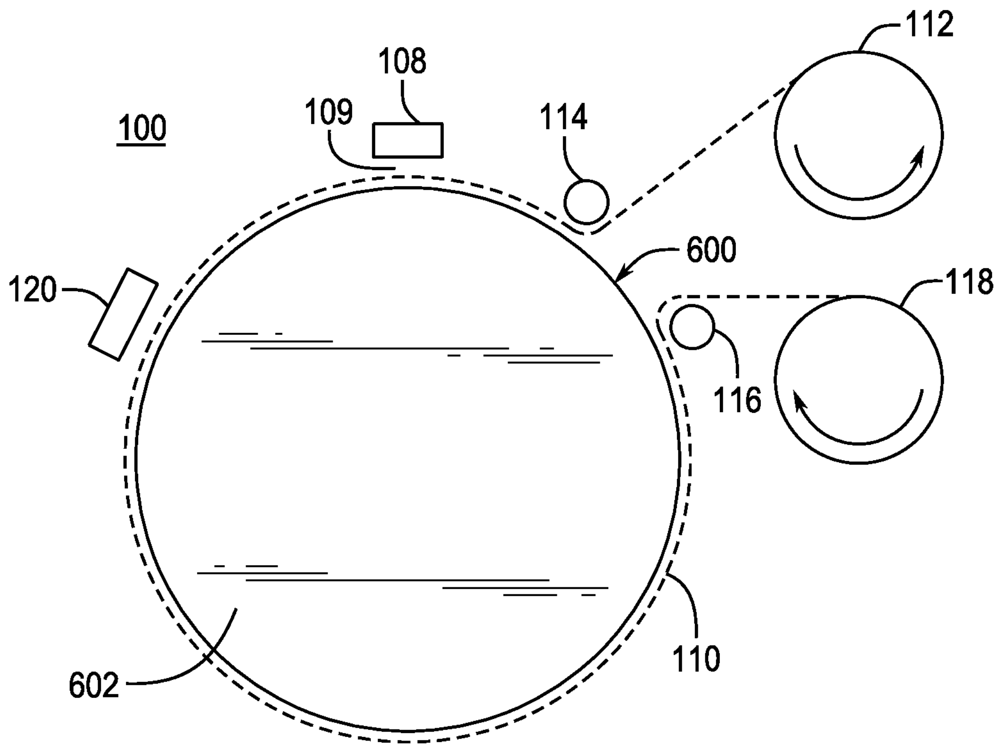
FIG. 6 is a schematic end view of a simplified printing system according to a further example.

In one example the printing drum 102 is an open drum i.e. without end members at each lateral end of the drum. In another example the printing drum 102 may be a partially closed drum, such as drum 600 shown in FIG. 6 with an end member 602.

Each of the support rollers 106 are supported within the printing system by a suitable support structure (not shown).

The support rollers 106 are arranged internal to the printing drum 104 such that the drum skin 104 is stably supported during operation. In one example, when two support rollers are provided, as shown in FIG. 1, the position of the support rollers 106 and the weight of the printing drum 102 are sufficient to ensure that the printing drum 102 rotates about a central axis and does not deviate therefrom during printing operations.

Figure 3:
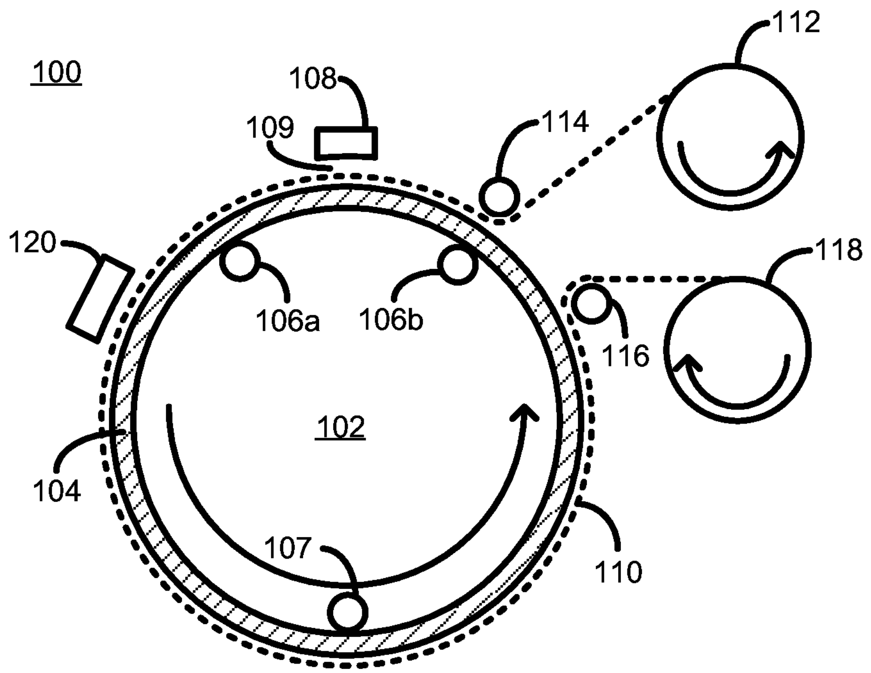
FIG. 3 shows a simplified cross-section view of a printing system according to one example.

In another example, shown in FIG. 3, one or multiple ancillary rollers 107 may be arranged to contact the internal surface of the drum skin 104 to add stability to the printing drum 102 during rotation. The ancillary rollers 107 do not support the weight of the drum but help improve the stability of the drum when the drum rotates. In the example shown in FIG. 3 an ancillary roller 107 is provided towards the base of the printing drum 102, although in other examples one or multiple ancillary rollers may be provided in any suitable position.

In one example, the printing system 100 additionally comprises a print engine 108 for printing on a substrate 110 when installed on the printing drum 102. The portion of a substrate on which the print engine 108 may print on is defined as a print zone 109.

The support rollers 106, and where present ancillary rollers, may be arranged to exert outward pressure on the drum skin 104 to help improve stability of the printing drum during rotation. Ancillary rollers 107 are compliant and move with the drum 102 as thermal effects alter the drum size while support rollers 106 are held ridged with respect to the print zone 109.

It should be noted that in one example the support rollers 106 are positioned as close as practically possible to the print zone 109. This helps reduces the impact of any thermal expansion experienced by the printing drum 102. In other examples other spacings may be used.

In one example, the printing drum 102 is positioned below the print zone 109, for example when an inkjet print engine is used. This helps ensure that printing fluid ejected by the inkjet printheads have a vertical, or at least a substantially vertical, trajectory. In other examples, however, the printing drum 102 may be positioned other than below the print zone 109.

Figure 7:
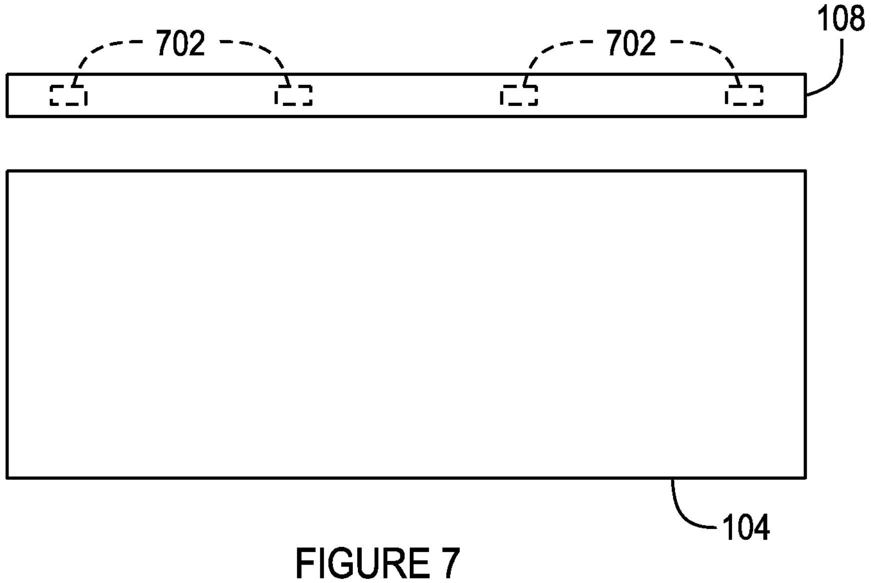
FIG. 7 is a schematic side view showing a print engine and a printing drum, according to yet another example.

In one example the print engine 108 may be a page-wide array inkjet print engine, for example comprising an array of inkjet printheads 702 (FIG. 7) configured to span along the whole, or substantially the whole, width of a substrate installed on the printing drum 102.

In one example, the printing system 100 may comprise a print engine 108 configured for printing with only a single color ink, such as black ink.

In another example, the printing system 100 may comprise multiple page-wide array inkjet print engines 108, with each print engine being configured to print using a different colored ink. For example, in one example four print engines may be provided, each for printing with one of cyan, yellow, magenta, and black ink. In this example, such a printing system may produce full color images.

Figure 4:
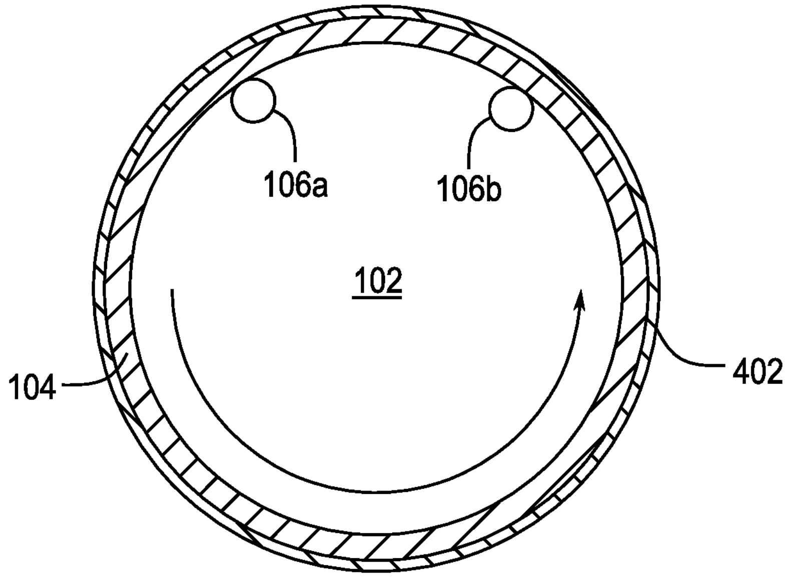
FIG. 4 is a cross-section view of a portion of a simplified printing system according to another example.

In a yet further example, the print engine 108 may be a liquid electro-photographic (LEP) print engine, for example such as those used in the Hewlett-Packard range of Indigo digital presses. In one example the print engine 108 may be an intermediate transfer member on which an LEP image has been produced, in which case the printing drum 102 may act as an impression drum. In another example the print engine 108 may be one or multiple binary ink developers (BID), in which case the printing drum 102 may be covered with a blanket and may act as an intermediate transfer mechanism. In a yet further example the print engine 108 may be an imaging module to create a latent electrostatic image on a photoconductor layer 402 surrounding the drum 102, as shown in FIG. 4.

The substrate 110 is provided from a substrate roll 112. The substrate 110 is fed through a substrate entry roller 114 located in proximity to the printing drum 102 from which the substrate 110 feeds around the printing drum 102 to a substrate exit roller 116 from which the substrate 110 exits the printing drum 102. The substrate 110 is then wound on a collector roller 118.

In the present example a drying or curing module 120 is provided which is located around the periphery of the printing drum 102 downstream (in a printing direction) of the print engine 108. The drying module 120 may provide, for example, one or more of: a stream of ambient air; a stream of heated air; infrared radiation; and ultra-violet radiation, to the substrate 110 when installed around the printing drum 102.

In other examples multiple drying or curing modules 120 may be provided around the periphery of the printing drum 102.

In other examples no drying module 120 may be provided.

As previously mentioned, during operating the printing drum 102 may undergo thermal expansion as it becomes heated. However, by supporting the printing drum 102 on internal support rollers 106 in close proximity to the print zone 109 helps mitigate the effects of any thermal expansion on the printing drum 102.

In one example the printing drum 102 is supported entirely by internal support rollers 106. In one example the printing drum 102 is supported entirely by internal support rollers 106 in conjunction with one or multiple ancillary rollers 107. One advantage of having the printing drum 102 supported entirely internally is that no support rollers are needed on the outside of the printing drum 102 which reduces the risk of damage being caused to content printed on the substrate 110.

In another example the printing drum 102 may be additionally supported by one or multiple support rollers on the outer surface of the drum skin 104, but which are so positioned that any printing fluid printed on the substrate 110 is dry before contact is made with such support rollers. This is to help reduce damage to content printed on the substrate 110.

Figure 5:
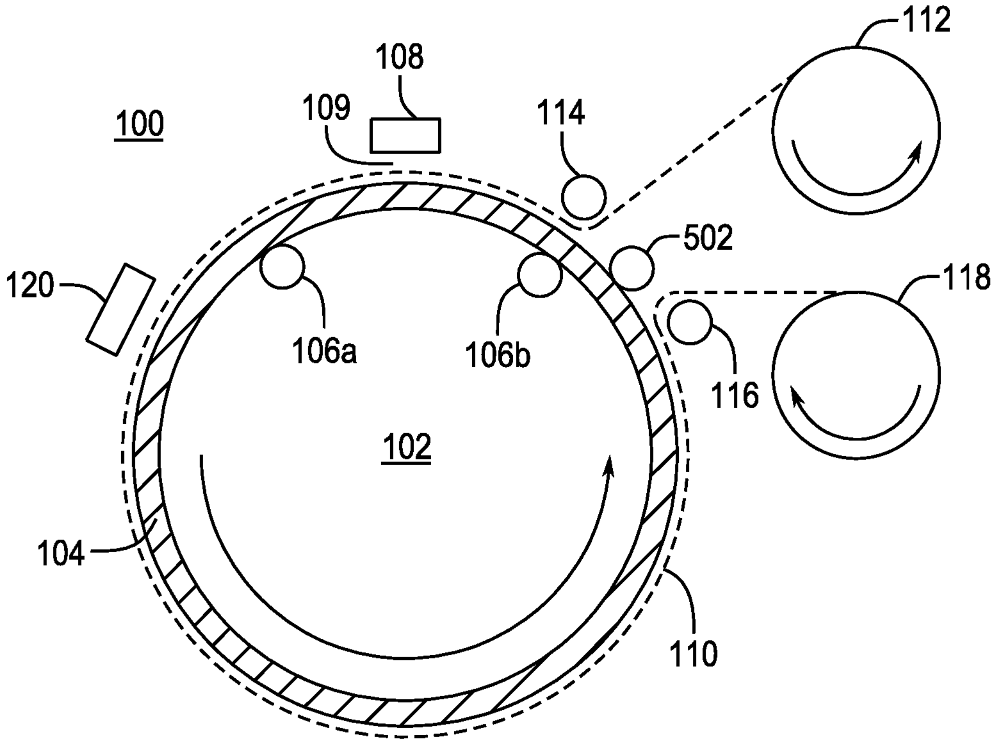
FIG. 5 is a cross-section view of a portion of a simplified printing system according to a further example.

In a yet further example, the printing drum 102 may be supported by one or multiple support rollers 502 (FIG. 5) on a portion of the outer surface of the drum not covered by the substrate 110.

As mentioned, examples of printing drums described herein may significantly reduce the effects of thermal expansion compared to comparable axially supported printed drums. Furthermore, since the effects of any thermal expansion are reduced, this may remove, in some situations, the need to include active cooling systems to cool the printing drum. For example, it is common for conventional printing drums to include cooling mechanisms, such as water cooling. Accordingly, use of printing drums as described herein can help reduce costs of printing systems using such printing drums.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:

a print engine for printing on a substrate in a print zone;

a drum positioned in proximity to the print zone, the drum supported by a plurality of support rollers in contact with an inner surface of the drum, wherein the print engine is for applying printing fluid in the print zone to a portion of the substrate positioned on the drum.

2. The printing system of claim 1, further comprising a non-supporting ancillary roller in contact with the inner surface of the drum to add stability to the drum when the drum rotates.

3. The printing system of claim 1, wherein the drum is rotatable about an axis central to the drum even though no central axle is provided.

4. The printing system of claim 1, further comprising a drying module located around a periphery of the drum and downstream from the print engine to apply heat to a portion of the substrate positioned on the drum.

5. The printing system of claim 1, further comprising a support roller to support the drum on a portion of the outer surface of the drum at which no substrate is positioned.

6. The printing system of claim 1, wherein the print engine is an inkjet-based print engine.

7. The printing system of claim 6, wherein the print engine comprises a plurality of inkjet printheads that span, or substantially span, the width of the drum.

8. A printing system comprising:

a print engine for printing on a substrate in a print zone;

a drum positioned in proximity to the print zone, the drum supported by a plurality of support rollers in contact with an inner surface of the drum, wherein one of the support rollers is powered to impart rotational motion to the drum.

9. The printing system of claim 8, wherein the drum is a printing drum for receiving the substrate to be printed on.

10. A printing system comprising:

a print engine for printing on a substrate in a print zone;

a drum positioned in proximity to the print zone, the drum supported by a plurality of support rollers in contact with an inner surface of the drum; and a powered wind roller onto which the substrate is wound after a printing operation, such that the drum is driven indirectly by the substrate in contact with the drum.

11. A printing system comprising:

a print engine for printing on a substrate in a print zone;

a drum positioned in proximity to the print zone, the drum supported by a plurality of support rollers in contact with an inner surface of the drum, wherein the printing system is an electrostatic printing system and wherein the drum is covered with a photoconductor layer on which a latent electrostatic image may be developed.

12. A printing system comprising:

a print engine for printing on a substrate in a print zone;

a drum positioned in proximity to the print zone, the drum supported by a plurality of support rollers in contact with an inner surface of the drum, wherein the drum is at least a partially closed drum.

* * * * *